(12) United States Patent  (10) Patent No.: US 9,016,753 B2
McDermott, III  (45) Date of Patent: Apr. 28, 2015

(54) TAILGATE GAP COVER

(71) Applicant: Martin Daniel McDermott, III, Plainwell, MI (US)

(72) Inventor: Martin Daniel McDermott, III, Plainwell, MI (US)

(*) Notice: Subject to any disclaimer, the term of this patent is extended or adjusted under 35 U.S.C. 154(b) by 0 days.

(21) Appl. No.: 14/033,684

(22) Filed: Sep. 23, 2013

(65) Prior Publication Data

US 2015/0084361 A1  Mar. 26, 2015

(51) Int. Cl.
*B62D 33/03* (2006.01)
*B62D 33/027* (2006.01)

(52) U.S. Cl.
CPC ............ *B62D 33/0273* (2013.01); *B62D 33/03* (2013.01)

(58) Field of Classification Search
CPC ........ B60R 13/01; B60R 13/043; B60J 5/102; B60J 5/103; B60J 5/104; B62D 33/027; B62D 33/03
USPC ........................ 296/50, 57.1, 106, 146.8, 39.2
See application file for complete search history.

(56) References Cited

U.S. PATENT DOCUMENTS

| | | | | |
|---|---|---|---|---|
| 3,544,155 A * | 12/1970 | Gardner | ....................... | 296/57.1 |
| 3,881,768 A * | 5/1975 | Nix | ............................... | 296/39.2 |
| 4,763,945 A * | 8/1988 | Murray | ........................ | 296/57.1 |
| 4,986,590 A * | 1/1991 | Patti et al. | ..................... | 296/39.2 |
| 5,188,415 A * | 2/1993 | Wagner | ........................ | 296/57.1 |
| 5,664,822 A * | 9/1997 | Rosenfield | .................... | 296/39.2 |
| 5,904,391 A * | 5/1999 | Liljenquest et al. | ......... | 296/57.1 |
| 6,293,602 B1 * | 9/2001 | Presley | ....................... | 296/26.11 |
| 6,367,858 B1 * | 4/2002 | Bradford | ................... | 296/26.09 |
| 6,540,278 B2 * | 4/2003 | Presley | ....................... | 296/146.8 |
| 6,749,245 B1 * | 6/2004 | Walker | ........................ | 296/57.1 |
| 7,052,070 B1 * | 5/2006 | Simonin | ...................... | 296/57.1 |
| 7,401,832 B2 * | 7/2008 | Yui et al. | ..................... | 296/57.1 |
| 8,172,309 B1 * | 5/2012 | Weir | .......................... | 296/183.1 |
| 8,459,716 B2 * | 6/2013 | Kaplan | ........................ | 296/57.1 |
| 8,668,240 B2 * | 3/2014 | Elliott et al. | ................. | 296/57.1 |
| 2002/0074818 A1 * | 6/2002 | Presley | ....................... | 296/57.1 |
| 2011/0080017 A1 * | 4/2011 | Olson | ......................... | 296/57.1 |
| 2012/0222357 A1 * | 9/2012 | Elliott et al. | .................... | 49/383 |
| 2012/0223541 A1 * | 9/2012 | Gianino | ....................... | 296/57.1 |

* cited by examiner

*Primary Examiner* — Gregory Blankenship
(74) *Attorney, Agent, or Firm* — Miller, Canfield, Paddock and Stone; Mark L Maki

(57) ABSTRACT

A tailgate gap cover is mountable to a vehicle, such as a pickup truck, so as to cover the gap between a truck bed and a tailgate surface. One edge of the gap cover is confined within an elongate mounting rail wherein the mounting rail is crimped at the opposite ends so as to prevent lateral movement of the cover. This mounting rail is secured directly to the truck bed to provide a rigid mount on the truck bed side of the gap. The opposite free edge of the cover overlies the tailgate includes connector formations or fastener structures which releasably snap onto corresponding connector formations or fastener structures on the tailgate.

18 Claims, 3 Drawing Sheets

TAILGATE GAP COVER

FIELD OF THE INVENTION

The invention relates to tailgate gap cover for a vehicle, such as a pickup truck, to eliminate and prevent debris from becoming wedged in the gap between the truck bed and tailgate which can make it difficult to lift and lower the tailgate and can cause damage thereto.

BACKGROUND OF THE INVENTION

It is known to provide tailgate gap covers on vehicles, such as pickups to cover the gap between the truck bed and the tailgate. This forms a horizontal surface bridging the gap between the truck bed and tailgate surface when the tailgate is lowered to the open position wherein the continuous surface simplifies sweeping of debris out of the bed during cleaning or unloading of the truck bed. The continual horizontal surface therefore prevents the debris from falling into the gap and causing difficulties in opening and closing of the tailgate.

Referring to FIGS. 1-3 hereof, a prior art tailgate gap cover is illustrated, which gap cover is disclosed in more detail in U.S. Pat. No. 4,763,945 (Murray). This illustrates one example of a known tailgate gap cover. Referring to FIGS. 1-3, a tailgate truck mat 1 is shown which is formed of a resilient flexible material forming a strip whereby the strip can be fastened by suitable screws to the interface of the pickup truck tailgate 3 along the lower edge portion thereof. A strip of magnetic material 1b is embedded into the bottom surface of the strip 1, the magnetic strip 1b being engageable with the flat end portion of the truck bed 4.

In use, the mat 1 is secured to the tailgate 3 and extends over the gap or track 5 between the tailgate and the end of the truck bed. The screws 2 hold one side of the strip and the magnetic strip 1b holds the other side of the strip against the truck bed, but allows the respective edge portion of the mat to slide on the bed during the opening and closing of the tailgate 3. In the embodiment of FIG. 1, some prior art pickup trucks have conventional reinforcing ribs 4a which do not extend the full length of the bed. Referring to FIG. 2, other known pickup trucks are manufactured with ribs 4b that extend the full length of the bed. The mat 1 as disclosed in the '945 patent is designed to accommodate these different configurations. However, this prior art mat 1 is believed to possess deficiencies when in use.

It is in the object of the present invention to overcome disadvantages with prior art gap covers and to provide an improved gap cover.

The present invention relates to a tailgate gap cover which is mountable to a vehicle, such as a pickup truck, so as to cover the gap between a truck bed and a tailgate surface, particularly when the tailgate is in an open, lowered position. The gap cover of the present invention includes a generally rectangular cover which is flat and resiliently flexible and is sized in the front-to-back direction so as to span or bridge the gap defined between the truck bed and tailgate.

One edge of the cover preferably is confined within an elongate mounting rail which is formed with a C-shaped cross section to receive the edge of the cover and is compressed therein. Preferably the mounting rail is crimped at the opposite ends so as to prevent lateral movement of the cover along the mounting rail. This mounting rail is secured directly to the truck bed to provide a rigid mount on the truck bed side of the gap.

The opposite free edge of the cover which overlies the tailgate includes connector formations or fastener structures which preferably are formed as snaps that releasably snap onto corresponding connector formations or fastener structures on the tailgate. Preferably, the gap cover includes an attachment rail which is formed as a relatively rigid rail that is secured directly to the tailgate by suitable fasteners. In turn, this attachment rail includes the tailgate connector formations which are located so as to releasably engage with the corresponding cover connector formations on the gap cover and thereby define a releasable or disengageable connection. When the connector formations are respectively engaged with each other, the gap cover is fixedly secured to both the truck bed and the tailgate. When the fasteners are disengaged, the tailgate can be removed, wherein the gap cover can hang free so as to continue to protect the rear edge of the truck bed and provide a continuous surface extension extending from the truck bed that helps when removing debris therefrom. This tailgate gap cover is believed to provide advantages over known gap covers.

Other objects and purposes of the invention, and variations thereof, will be apparent upon reading the following specification and inspecting the accompanying drawings.

Figure 1:
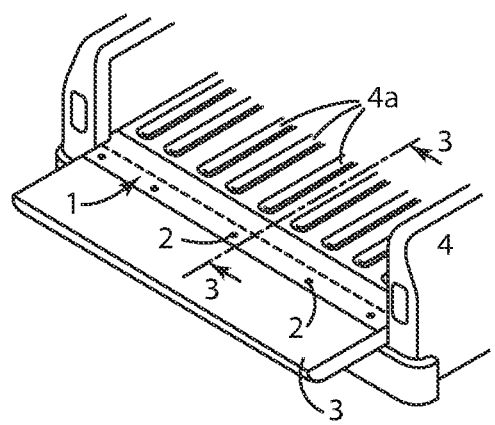
FIG. 1 illustrates a first embodiment of a pickup truck with a prior art gap cover.
Figure 2:
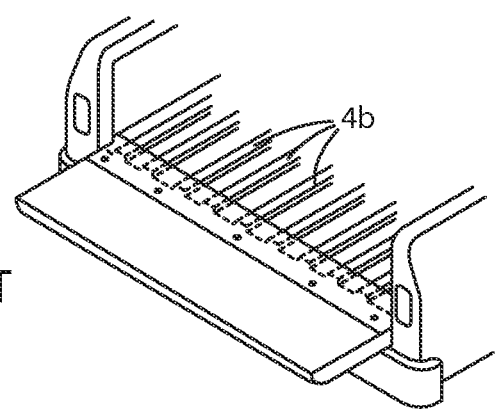
FIG. 2 illustrates a second embodiment of a pickup with the prior art gap cover.
Figure 3:
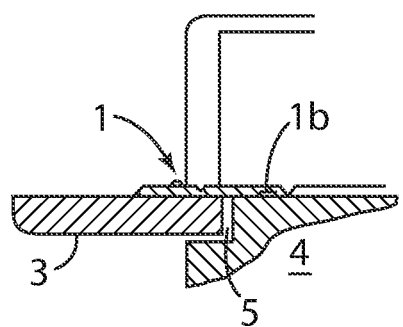
FIG. 3 is a side cross-sectional view of the prior art gap cover as taken along line 3-3 of FIG. 1.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 4:
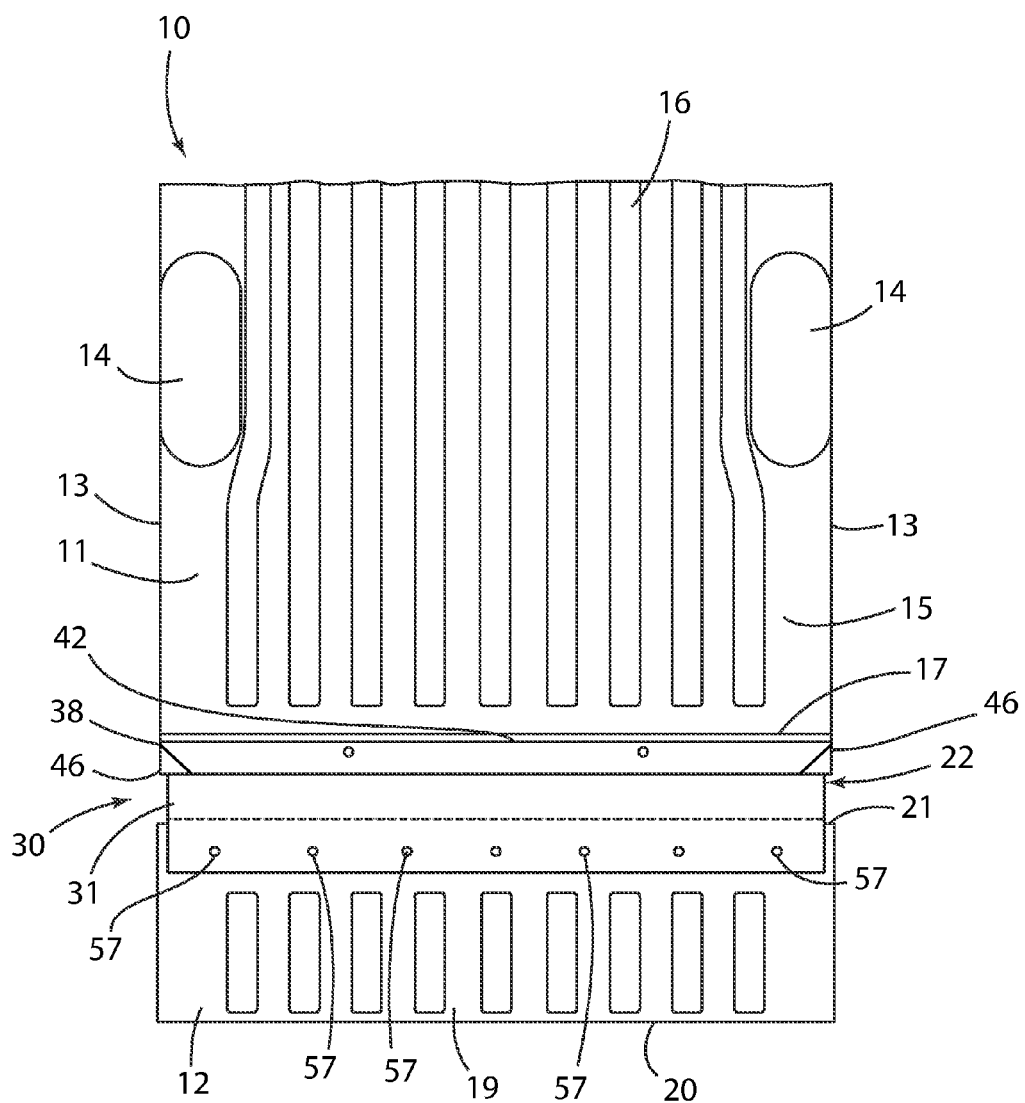
FIG. 4 is a partial plan view of a truck bed and tailgate with an inventive tailgate cover gap mounted thereto.

Referring to FIG. 4, a conventional pickup 10 is shown which comprises a truck bed 11 and a pivotable tailgate 12, which pickup 11 and tailgate 12 can be formed in any conventional manner in accord with the typical construction of a well-known pickup. This pickup 10 has a truck bed 11 formed with sidewalls 13, wheel wells 14, and horizontal bed surface 15 which bed surface 15 typically includes horizontally-elongate, raised reinforcing ribs 16 which can be seen in FIG. 4.

The tailgate 12 typically is connected to rear edge 17 of the truck bed 11 by any conventional hinge structure. As such, the tailgate 12 may move vertically from a raised position to a lowered, open position as shown in FIG. 4 and vice versa. In the lowered position of FIG. 5, the tailgate surface 19 lies substantially horizontal in substantially the same plane as the bed surface 15 but these surfaces are separated by a tailgate gap 22. In particular, the tailgate 12 is defined between a free or upper gate edge 20 and a lower gate edge 21 which is disposed closely adjacent to the rear bed edge 17 wherein the gap 22 is formed therebetween. The gap 22 typically is relatively small and extends laterally between the bed sidewalls 13. This gap 22 in a conventional pickup opens downwardly towards the rear bumper of the vehicle and varies in spacing depending upon the position of the tailgate 12 i.e., depending upon whether the tailgate 12 is in the opened or closed position.

One significant problem occurs when tailgate 12 is in the open position shown in FIG. 4 wherein the gap 22 allows various types of debris like rocks, gravel, dirt, sand, mulch, sticks and the like to fall into the gap 22 and be trapped on the top surface of the bumper. Such debris is not able to freely clear itself and instead builds up so as to partially or completely fill the gap 22. In such an undesirable condition, it may be difficult, if not impossible to close tailgate 12 or if closable, the tailgate 12 and rear bed edge 17 may be damaged by the pinching of debris within the gap 22. The fill-up of debris often occurs during the unloading of the truck bed 11, as well as during the loading thereof, and may be particularly problematic when small pieces of debris are being swept out of the truck bed 11, such as when cleaning the truck bed 11 by a broom or the like. Hence, it is often necessary to manually clear the debris from the gap 22 whenever a problematic build-up occurs such as by hand picking and scraping the debris out of the tailgate gap 22.

Figure 5:
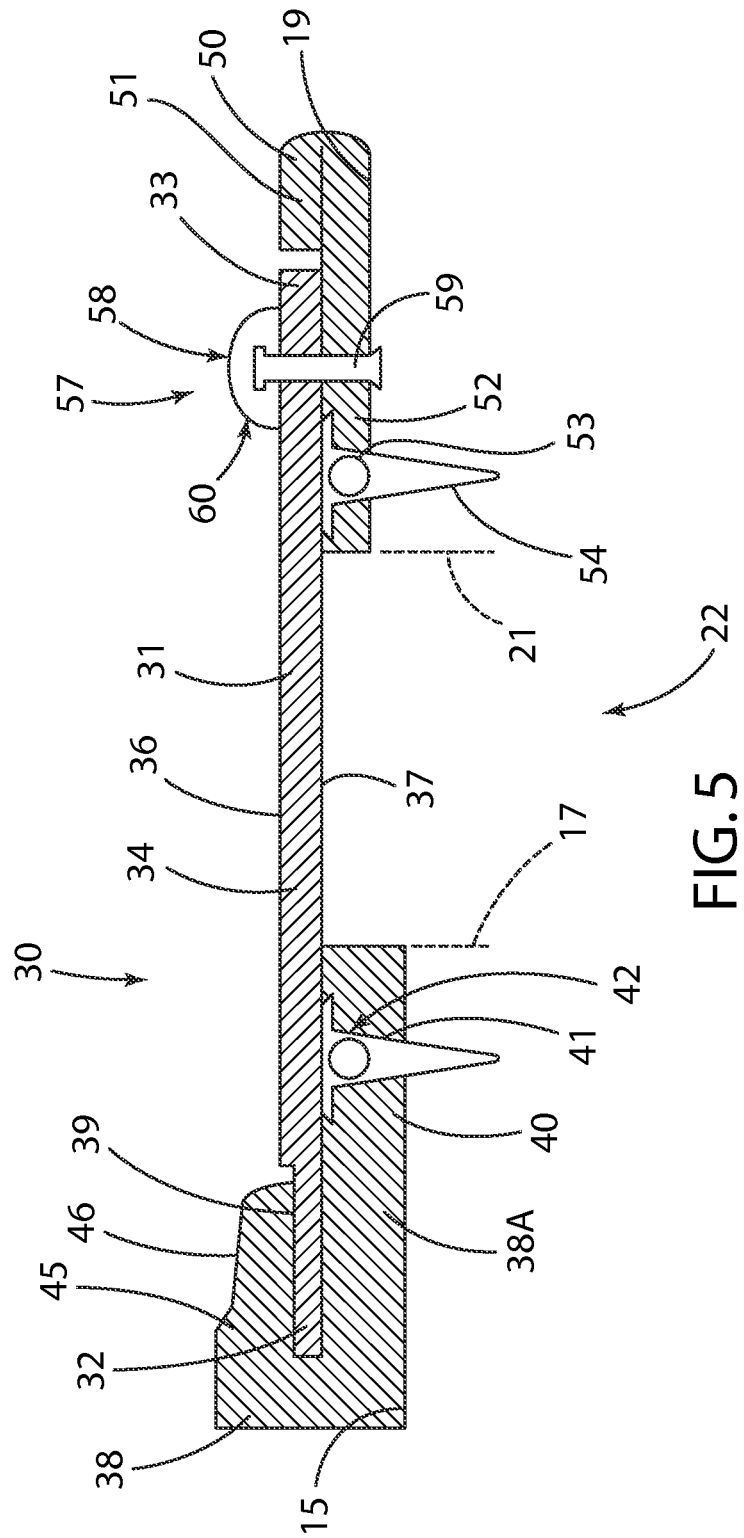
FIG. 5 is a side cross-sectional view of the inventive gap cover.

To overcome such problems, FIGS. 4 and 5 illustrate a tailgate gap cover 30 of the present invention. The tailgate gap cover 30 spans the gap 22 between the rear bed edge 17 and lower tailgate edge 21 so as to prevent the debris from entering this gap 22.

More particularly, the cover 30 comprises a generally rectangular elongate flexible and compressible cover flap 31, which is generally rectangular and is defined by a first bed-side edge portion 32 and a second gate-side edge portion 33 which are joined by an intermediate flap portion 34 extending therebetween. The intermediate flap portion 34 essentially spans the tailgate gap 22 as seen in FIG. 5 and has an upper surface 36 which is exposed during use and defines a continuous horizontal extension of the bed surface 15 toward the tailgate surface 19. The intermediate flap portion 34 also has a bottom surface 35 which faces downwardly so as to overlie and enclose the tailgate gap 22.

With respect to the first edge portion 32, this edge portion 32 is affixed to a relatively rigid, horizontally elongate mounting rail 38 which extends along substantially the entire horizontal width of the cover flap 31 as best seen in FIG. 4.

Referring to FIG. 5, the mounting rail 38 is formed as a C-shaped channel, having a receiver channel 39 formed interiorly thereof. Preferably, the mounting rail 38 is formed from a rigid, deformable metal such as extruded aluminum or other suitable material. The mounting rail 38 has a base flange 38A which underlies the cover flap 31 and includes an end flange section 40 which extends toward the bed edge 17 and is formed with fastener formations which comprise a plurality of screw holes 41 and screw fasteners 42. The screw holes 41 are evenly spaced apart and configured to receive a respective sheet-metal screw fastener 42 therein. These fasteners 42 also are shown in FIG. 4 and are configured for rotational driving directly into the truck bed surface 15 so as to rigidly and fixedly secure the mounting rail 38 directly to the truck bed 11. Other fastening means might be used such as rivets, adhesive or the like.

In this position, the mounting rail 38 extends horizontally along the rear bed edge 17. The mounting rail 38 also includes a rearwardly projecting upper leg 45 which defines an upper side of the channel 39 so that the first bed-side edge portion 32 of the cover flap 31 can be received within such channel 39 and secured in place by suitable compression of the bed-side edge portion 32 between the base flange 38A and the upper leg 45.

As one advantage of the present invention, the mounting rail 38 is crimped at discrete locations to define crimps 46, preferably located at each of the terminal ends of the mounting rail 38 as seen in FIGS. 4 and 5. These crimps 46 tightly pinch the flexible and compressible material of the cover flap 31 and also prevent lateral or transverse movement of the cover flap 31 along the length of the receiver channel 39. Therefore, while deformation of upper leg 45 serves to help secure the first edge portion 32 therein, the crimps 46 provide an additional level of increased tight fitting engagement which helps prevent the lateral movement of the cover flap 31 relative to the mounting rail 38.

During installation of the mounting rail 38 on the truck bed 15, it is noted that the second edge portion 33 of the cover flap 31 is free and the intermediate flap portion 34 can bend upwardly so as to expose the screw holes 41 and allow the screws 42 to be secured in place. The cover flap 31 can then be folded back downwardly, so as to cover the fastener formations, span or bridge the tailgate gap 22 and position the second gate-side edge portion 33 for removable fastening to the tailgate 12.

Referring more particularly to the attachment of the cover flap 31 to the tailgate 12, the gap cover 30 is provided with a separable, attachment rail 50 which is formed of a suitable deformable metal, such as aluminum. The attachment rail 50 preferably is folded along one side edge to form a rigidifying hem 51. The opposite side edge of the attachment rail 50 generally is formed as a flat plate that defines a base 52 that is positionable on the top tailgate surface 19 near the lower tailgate edge 21. This base 52 is formed with fastener formations comprising a plurality of spaced-apart fastener holes 53 which each receive a suitable fastener 54 therethrough. Preferably, the fastener 54 is a sheet metal screw that can be screwed directly into the tailgate 12 to affix the attachment rail 50 to the tailgate surface 19.

The attachment rail 50 and the second gate-side edge portion 33 of the cover flap 31 are provided with cooperating connector structures 57 that allow for removable attachment of the second flap edge 33 directly to the attachment rail 50. In the preferred form of the invention, the connector structure 57 is defined as a snap connector 58 which comprises a post 59 and a separable button 60. In this regard, the post 59 for each snap connector 58 is rigidly and fixedly secured to the attachment rail 50 while each button or head 60 is securely fixed to the second gate-side edge portion 33 of the cover flap 31.

FIG. 4 illustrates a plurality of these connector structures 57 spaced equidistantly across the transverse width of the gap cover 30. In this regard, each snap button 60 is preferably snapped to its respective post 59 so that the second gate-side edge portion 33 is releasably secured to the tailgate 12 by its cooperation with the attachment rail 50. This prevents the intermediate flap portion 34 from sagging under weight such as when an individual may be walking on the tailgate 12 or when sweeping debris out of the truck bed 11. However, it may be desirable to disengage the gate-side edge portion 33 and separate the cover flap 31 from the stationary attachment rail 50. For example, it may be desirable to remove the tailgate 12 from the truck bed 11 which process requires disengagement of the cover flap 31 from the attachment rail 50. After the tailgate 12 is removed, the cover flap 31 can continue to hang free as an extension of the truck bed surface 15 which helps to redirect debris away from the bumper. Also, there may be cases when the tailgate 12 remains in position, but it is still desirable to access the tailgate gap 22. As such, the disengageable gate-side edge portion 33 of the cover flap 31 can be disengaged and folded forwardly over the truck bed 11 so as to provide access to the tailgate gap 22 or even provide access to the fasteners 42 described above.

Therefore, one advantage of the present inventive gap cover 30 is the ability to secure both edges wherein one of the edges remains permanently secured to the truck bed for all intents and purposes. It will be understood that the reference to "permanent" does envision that the screws 42 could be removed and the mounting rail 38 removed from the truck bed. Hence, the term "permanent" as used herein refers to the affixing of the mounting rail 38 in place and the continuous connection between the mounting rail 38 and cover flap 31 during conventional usage. The opposite gate-side, free edge portion 33, however, differs in that it is removably engaged to its corresponding attachment rail 50.

During installation, the cover 30 is screwed to the truck bed 11 by screwing the fasteners 42 through the mounting rail 38, which mounts the cover 30 in place on the truck bed 11 for use. During this installation step, the flexible cover flap 31 is bent upwardly to expose the screw holes 41, and after installation, the cover flap 31 is allowed to fold down to cover the tailgate gap 22. On the tailgate side of the gap 22, the attachment rail 50 is fastened to the tailgate 12 by respective fasteners 54. The snap buttons 60 are snapped onto the posts 59 to form a releasable fastener connection between the cover flap 31 and tailgate 12. This prevents the debris from falling into the gap 22 during normal use.

It will be noted by the skilled artisan that the installation of the cover 30 can be reversed with the mounting rail 38 being attached to the tailgate 12 and the attachment rail being fastened to the truck bed 11.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A tailgate gap cover for covering a tailgate gap formed between spaced vehicle edge sections of a truck bed and a tailgate, said gap cover comprising:
    a cover flap having a length corresponding to a transverse length of a tailgate gap and a width in a front to back direction which spans a tailgate gap, said cover flap comprising first and second side edges which extend transversely and are spaced apart in the front to back direction to define said width;
    a mounting rail which is mountable to one vehicle edge section on one side of a tailgate gap, said mounting rail comprising a transversely elongate channel which has an open side receiving said first side edge of said cover flap therein, said cover flap being non-removably fixed within said channel for secure mounting to the vehicle edge section, said mounting rail including fastener formations for mounting to the vehicle edge section; and
    an attachment rail which includes fastener formations for mounting to another vehicle edge section on the other side of a tailgate gap opposite to said mounting rail, said attachment rail and said second side edge of said cover flap including cooperating connector formations which are engagable to secure said second side edge to said attachment rail and releasable to permit separation of said cover flap from said attachment rail.

2. The gap cover according to claim 1, wherein said fastener formations on at least one of said mounting rail and said attachment rail are disposed below said cover flap.

3. The gap cover according to claim 2, wherein said fastener formations comprise screws extending through said mounting rail and said attachment rail.

4. The gap cover according to claim 3, wherein said mounting rail includes a base flange extending below said cover flap which can be exposed by bending of said cover flap upwardly and is covered when said cover flap spans a tailgate gap during use.

5. The gap cover according to claim 2, wherein said connector formations comprise snap connectors.

6. The gap cover according to claim 1, wherein said mounting rail includes spaced crimps which pinch said first side edge of said cover flap within said channel to prevent transverse movement within said channel.

7. A tailgate gap cover for covering a tailgate gap formed between spaced vehicle edge sections of a truck bed and a tailgate, said gap cover comprising:
    a cover flap having a length corresponding to a transverse length of a tailgate gap and a width in a front to back direction which spans a tailgate gap, said cover flap comprising first and second side edges which extend transversely and are spaced apart in the front to back direction to define said width;
    a mounting rail which is mountable to one vehicle edge section on one side of a tailgate gap, said mounting rail comprising a transversely elongate channel which has an open side receiving said first side edge of said cover flap therein, said cover flap being non-removably fixed within said channel for secure mounting to the vehicle edge section, said mounting rail including fastener formations for mounting to the vehicle edge section, said mounting rail including a base flange extending below said cover flap which includes said fastener formations that can be exposed by bending of said cover flap upwardly and are covered when said cover flap spans a tailgate gap during use; and
    an attachment rail which includes fastener formations for mounting to another vehicle edge section on the other side of a tailgate gap opposite to said mounting rail, said attachment rail and said second side edge of said cover flap including cooperating connector formations which are engagable to secure said second side edge to said attachment rail and releasable to permit separation of said cover flap from said attachment rail.

8. The gap cover according to claim 7, wherein said attachment rail includes a base which includes said fastener formations disposed below said cover flap when said cover flap is engaged with said attachment rail.

9. The gap cover according to claim 7, wherein said fastener formations comprise screws extending through said mounting rail and said attachment rail.

10. The gap cover according to claim 7, wherein said connector formations comprise snap connectors.

11. The gap cover according to claim 7, wherein said mounting rail includes spaced crimps which pinch said first side edge of said cover flap within said channel to prevent transverse movement of said first side edge within said channel.

12. A tailgate gap cover for covering a tailgate gap formed between spaced vehicle edge sections of a truck bed and a tailgate, said gap cover comprising:
    a cover flap having a length corresponding to a transverse length of a tailgate gap and a width in a front to back direction which spans a tailgate gap, said cover flap comprising first and second side edges which extend transversely and are spaced apart in the front to back direction to define said width, and being formed of a flexible cover material which is compressible;
a mounting rail which is mountable to one vehicle edge section on one side of a tailgate gap, said mounting rail comprising a transversely elongate channel which has an open side receiving said first side edge of said cover flap therein, said cover flap being non-removably fixed within said channel for secure mounting to the vehicle edge section wherein said mounting rail includes spaced crimps which compress and pinch said first side edge of said cover flap within said channel to prevent transverse movement within said channel, said mounting rail including fastener formations for mounting to the vehicle edge section; and
an attachment rail which includes fastener formations for mounting to another vehicle edge section on the other side of a tailgate gap opposite to said mounting rail, said attachment rail and said second side edge of said cover flap including cooperating connector formations which are engagable to secure said second side edge to said attachment rail and releasable to permit separation of said cover flap from said attachment rail.

13. The gap cover according to claim 12, wherein said fastener formations on at least one of said mounting rail and said attachment rail are disposed below said cover flap.

14. The gap cover according to claim 12, wherein said fastener formations comprise screws extending through said mounting rail and said attachment rail.

15. The gap cover according to claim 14, wherein said mounting rail includes a base flange extending below said cover flap which can be exposed by bending of said cover flap upwardly and is covered when said cover flap spans a tailgate gap during use.

16. The gap cover according to claim 15, wherein said attachment rail includes a base which includes said fastener formations disposed below said cover flap when said cover flap is engaged with said attachment rail.

17. The gap cover according to claim 12, wherein said attachment rail includes a base which includes said fastener formations disposed below said cover flap when said cover flap is engaged with said attachment rail.

18. The gap cover according to claim 12, wherein said connector formations comprise snap connectors.

\* \* \* \* \*